United States Patent [19]

Shimomoto

[11] 4,166,801
[45] Sep. 4, 1979

[54] FOAM ELIMINATING DEVICE

[75] Inventor: Tsunemitsu Shimomoto, Yokohama, Japan

[73] Assignee: Ataka Kogyo Kabushiki Kaisha, Osaka, Japan

[21] Appl. No.: 739,138

[22] Filed: Nov. 5, 1976

[30] Foreign Application Priority Data

Nov. 6, 1975 [JP] Japan .............................. 50-133367

[51] Int. Cl.² .......................................... B01D 19/02
[52] U.S. Cl. ...................................... 252/361; 55/178
[58] Field of Search ............................. 252/360–363; 55/184, 185, 186, 199, 87, 178; 203/20; 202/264; 210/13

[56] References Cited

U.S. PATENT DOCUMENTS

| | | | |
|---|---|---|---|
| 1,887,775 | 11/1932 | Meinzer | 252/360 |
| 2,106,589 | 1/1938 | Bigger et al. | 55/185 |
| 2,490,421 | 12/1949 | Denhard | 252/361 |
| 2,610,155 | 9/1952 | Humfeld et al. | 55/178 |
| 3,018,843 | 1/1962 | Mercier | 55/178 |
| 3,262,252 | 7/1966 | Ebner | 55/178 |
| 3,574,136 | 4/1971 | Werth | 252/360 |

Primary Examiner—Wilbur L. Bascomb, Jr.
Attorney, Agent, or Firm—Stevens, Davis, Miller & Mosher

[57] ABSTRACT

A foam eliminating device which can mechanically pulverize and eliminate foam produced in sewage liquid is disclosed. The device comprises a casing partitioned into a foam collection chamber and a purified air chamber, a movable grid rotatably journalled in an opening for communicating the foam collection chamber with the purified air chamber, and means for rotating the movable grid and pulverizing foam passing from the foam collection chamber into the purified air chamber by means of the movable grid.

4 Claims, 4 Drawing Figures

FOAM ELIMINATING DEVICE

This invention relates to a foam eliminating device which can mechanically pulverize foam produced when sewage etc. is exposed to air or agitated.

In general, liquid containing a foaming substance such as a surface active agent or albuminous substance is foamed when it is exposed to air or agitated. The foam produced in a sewage disposal plant, for example, becomes scattered with wind to contaminate buildings or the washing hung out outside etc. with the foam. In addition, foam produced in a fermentation tank etc. is penetrated into pipes and instruments connected thereto thus inducing various problems and rendering the operation of the fermentation tank impossible.

In order to avoid such problems, a foam eliminating means is required. Heretofore it has been the common practice to eliminate foam by spraying water against the foam by means of nozzles or by injecting a foam eliminating agent into the foam.

The conventional foam eliminating means which makes use of the water spraying nozzles has the disadvantage that when it is applied to a sewage disposal plant, for example, the amount of sprayed water reaches to 30-100% of the amount of sewage to be disposed, and that such increased amount of sprayed water results in an increase of volume of a sewage disposal tank and dimension of piping.

The conventional foam eliminating means which makes use of the foam eliminating agent has the disadvantage that maintenance of the foam eliminating agent and control of injection thereof are not easy, that there is a risk of a secondary public pollution occurring by the presence of the foam eliminating agent, and that such conventional foam eliminating means is expensive and hence not economical.

An object of the invention, therefore, is to provide a foam eliminating device which can mechanically pulverize foam produced in sewage liquid and can separate and eliminate a foaming substance contained in the foam in an easy and less expensive manner.

A feature of the invention is the provision of a foam eliminating device comprising a casing partitioned into a foam collection chamber and a purified air chamber, a movable grid rotatably journalled in an opening for communicating said foam collection chamber with said purified air chamber, and means for rotating said movable grid and pulverizing foam passing from said foam collection chamber into said purified air chamber by means of said movable grid.

The invention will now be described in greater detail with reference to the accompanying drawings, wherein.

Figure 1:
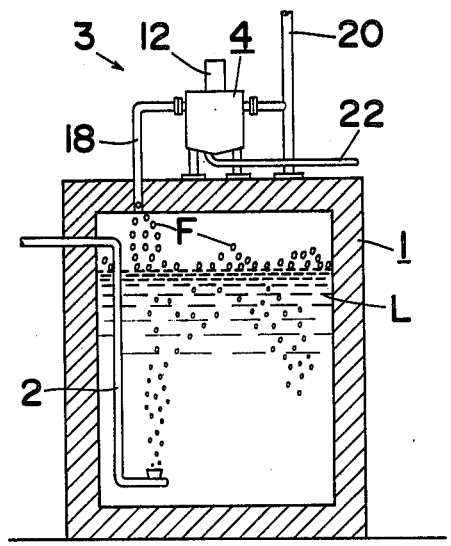
FIG. 1 is a front elevational view showing one embodiment of a foam eliminating device according to the invention mounted on a fermentation tank which is shown in section.

Referring to FIG. 1, reference numeral 1 designates a fermentation tank provided in a sewage disposal plan etc.. In this fermentation tank 1 is collected and accumulated sewage L. In this sewage L is inserted an air supply pipe 2 through which a fermentative air is blown into the sewage L.

Figure 2:
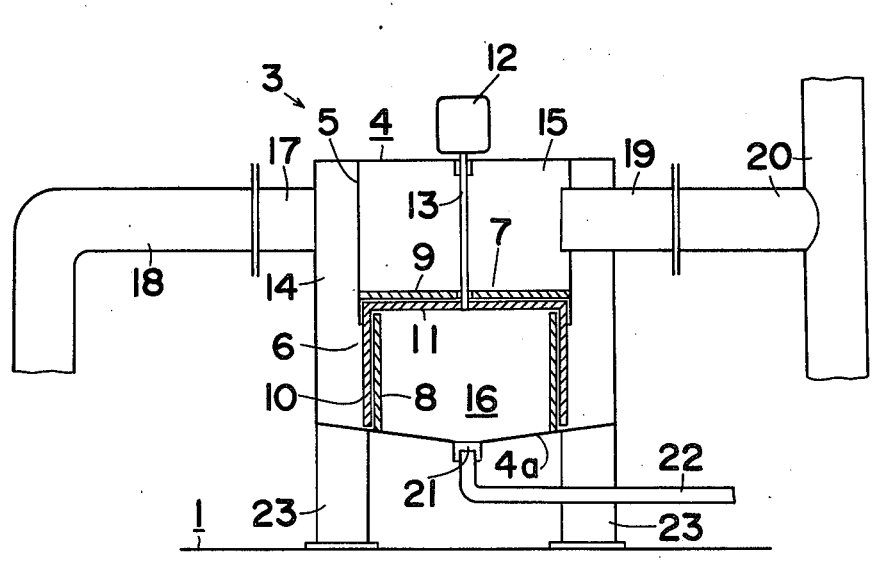
FIG. 2 is its longitudinal sectional view.
Figure 4:
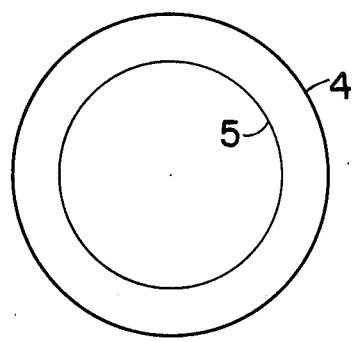
FIG. 4 is a transverse sectional view of the casing and partition wall in FIG. 2.

Referring to FIG. 2, on a top wall of the fermentation tank 1 is mounted a foam eliminating device 3 according to the invention. The foam eliminating device 3 comprises a substantially cylindrical casing 4 (FIG. 4) including a bottom plate 4a inclined downwardly toward its center and a cylindrical partition wall 5 (FIG. 4) having a diameter smaller than that of the casing 4 and arranged concentrically therein, the partition wall being secured to the top wall of the casing 4. Between the lower end of the partition wall 5 and the inclined bottom plate 4a of the casing 4 is formed an opening 6. In addition, the cylindrical partition wall 5 is provided at its lower end with an opening 7. To the bottom plate 4a of the casing 4 is secured an annular stationary grid 8 open at its upper end and arranged within the cylindrical partition wall 5 and facing toward the opening 6. In the opening 7 of the cylindrical partition wall 5 is arranged a disc-shaped stationary grid 9 secured to the inside surface of the lower end of the cylindrical partition wall 5. The annular stationary grid 8 is surrounded with a clearance by an annular movable grid 10 which is made integral with a disc-shaped movable grid 11 which is faced with a clearance to the lower surface of the disc-shaped stationary grid 9. Both the movable grids 10, 11 are connected through a shaft 13 to a motor 12 mounted on a center part of the top wall of the casing 4 and are rotated by the motor 12.

Figure 3:
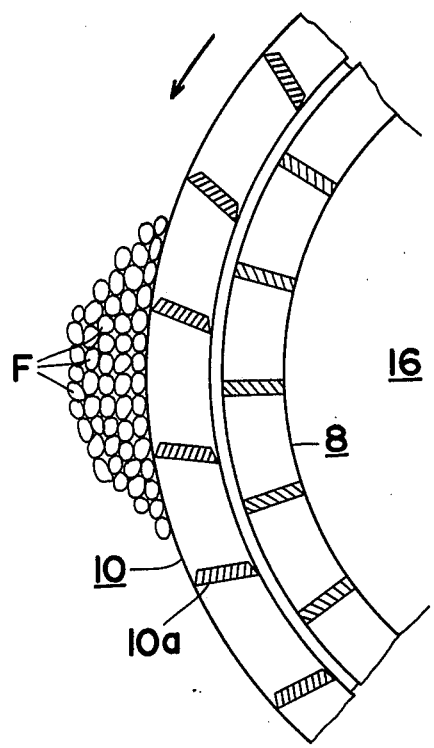
FIG. 3 is a transverse sectional view showing main parts of the device shown in FIG. 2 in an enlarged scale.

Referring to FIG. 3 each of the movable grids 10, 11 is provided with a plurality of grid elements 10a equally spaced apart from each other along the opposed annular walls of the movable grids 10, 11.

An end corner of each of said grid elements 10a at the foam inlet side thereof is inclined at an acute angle so as to impinge at the acute angle against foam when said movable grid is rotated. In addition, each of the grid elements 10a is inclined with respect to a moving direction of said movable grid so as to move its foam inlet side or its outside portion with later phase than the foam outlet side thereof or the inside portion thereof.

Referring to FIG. 2, between the outer surface of the cylindrical partition wall 5 and annular movable grid 10 on the one hand and the inner surface of the casing 4 on the other hand is formed a foam collection chamber 14. The cylindrical partition wall 5 defines therein a purified air chamber 15 and the movable grid 10, 11 define therein a separation chamber 16 therein.

Referring to FIGS. 1 to 3 the foam collection chamber 14 is communicated through a foam inlet opening 17 provided in the casing 4 and a foam inlet pipe 18 with the fermentation tank 1. The purified air chamber 15 is communicated through an exhaust opening 19 provided in the cylindrical partition wall 5 and an exhaust pipe 20 connected to the exhaust opening 19 with the outside of the device. The separation chamber 16 is communicated through a liquid outlet opening 21 provided at the center part of the base plate of the casing 4 and a liquid outlet pipe 22 connected to the liquid outlet opening 21 with the outside of the device.

The foam eliminating device 3 according to the invention is mounted on the fermentation tank 1 by means of supporting legs 23.

The sewage L collected and stored in the fermentation tank 1 contains a large amount of foaming substance and becomes fermented by air supplied from the air supply pipe 2 to produce a large amount of foam F. In this case, air supplied from the air supply pipe 2 causes the foam F to be fed from the fermentation tank 1 through the foam inlet pipe 18 and foam inlet opening 17 to the foam collection chamber 14. Some amount of the foam F in the foam collection chamber 14 is subjected to shearing action of the movable grid 10 which is rotated by the motor 12 and hence is pulverized. Since the side corner at the foam inlet side of each grid element 10a of the movable grid 10 is inclined at an acute angle so as to impinge at the acute angle against foam when said movable grid 10 is rotated and each grid element 10a is inclined with respect to a moving direction of said movable grid 10 so as to move its foam inlet side with later phase than the foam outlet side thereof, the foam F remains at the outer peripheral surface of the movable grid 10, thereby effectively eliminating the foam F. In addition, the remainder of the foam F that tends to penetrate through the movable grid 10 into the separation chamber 16 is struck against the stationary grid 8, so that most of the foam F becomes pulverized. A very small amount of the foam F penetrated through both the movable grid 10 and the stationary grid 8 into the separation chamber 16 is pulverized again by the movable grid 11 and the stationary grid 9 in the same manner as in the case of the movable grid 10 and the stationary grid 8, so that the foam F becomes completely eliminated. As a result, air not containing the foam F is introduced into the purified air chamber 15 from which the air is discharged through the exhaust opening 19 and exhaust pipe 20 into the outside.

Liquid containing a large amount of foaming substance produced when the foam F is pulverized as mentioned above and remaining in the separation chamber 16 is discharged through the liquid outlet opening 21 and liquid outlet pipe 22 into a recovery tank (not shown).

In the present embodiment, the movable grids 10, 11 are made rotated, but the stationary grids 8, 9 may also be rotated in a direction opposite to the direction of rotation of the movable grids 10, 11.

The foam eliminating device according to the invention has a number of advantages. In the first place, the foam produced in the fermentation tank can mechanically be pulverized by the movable grids to attain excellent foam eliminating effect in an easy and less expensive manner. Second, the foaming substance contained in the foam can be separated therefrom and recovered. Third, the presence of the stationary grid which is surrounded with a clearance by the movable grid makes it possible to strike the foam passed through the movable grid against the stationary grid to improve the foam pulverizing effect. Fourth, each grid element of the movable grid can also improve its foam pulverizing effect by the end corner at the foam inlet side of the movable grid being inclined at an acute angle so as to impinge at the acute angle against foam when said movable grid is rotated. Finally, since each grid element of the movable grid is inclined with respect to its moving direction so as to move its foam inlet side with later phase than the foam outlet side thereof, the foam remains at the outer peripheral surface of the movable grid, thereby effecting pulverizing of the foam thus remaining by the movable grid.

What is claimed is:

1. A foam eliminating device comprising:
   a casing having a bottom;
   a substantially vertical partition wall fixed at the upper end thereof on said casing partitioning said casing into a foam collection chamber exterior of said partition wall and a purified air chamber within said partition wall and defining therebelow a separation chamber which fluidly communicates said foam collection chamber with said purified air chamber;
   a stationary grid within said separation chamber below said partition wall and secured to the bottom of the casing;
   a movable grid rotatably journalled in said separation chamber and surrounding said stationary grid with a clearance therebetween, said movable grid being in fluid communication at the upper end thereof with said purified air chamber; and
   means for rotating said movable grid to pulverize foam passing from said foam collection chamber into said purified air chamber.

2. A foam eliminating device as claimed in claim 1 wherein said movable grid comprises a plurality of grid elements equally spaced apart from each other, an end corner of each of said grid elements at the foam inlet side or the outside portion thereof being inclined at an acute angle so as to impinge at the acute angle against foam when said movable grid is rotated.

3. A foam eliminating device as claimed in claim 2 wherein each of said grid elements is inclined with respect to a moving direction of said movable grid so that a line connecting the foam inlet side of each grid element with the rotary center of said movable grid is positioned backwards in the moving direction compared with a line connecting the foam outlet side thereof with said rotary center.

4. A foam eliminating device comprising:
   a substantially cylindrical substantially vertically extending casing having a bottom;
   a substantially cylindrical substantially vertically extending partition wall fixed at the upper end thereof on said casing, said wall being of substantially smaller diameter than said casing and partitioning said casing into a foam collection chamber exterior of said partition wall and a purified air chamber within said partition wall, said wall being spaced from the bottom of said casing and defining therebetween a foam separation chamber which fluidly communicates said foam collection chamber with said purified air chamber;
   a substantially cylindrical substantially vertically extending grid within said separation chamber, said grid being of smaller diameter than said partition wall, being secured to the bottom wall of said casing and extending upwardly therefrom and terminating in an upper end adjacent the lower end of said parition wall;
   a substantially annular substantially vertically extending grid rotatable about a substantially vertical axis, said rotatable grid having a diameter slightly less than that of said partition wall and slightly greater than that of said stationary grid and defining an annular clearance therebetween, said rotatable grid being in fluid communication at the upper end thereof with said purified air chamber; and
   means for rotating said movable grid to pulverize foam passing from said foam collection chamber into said purified air chamber through said foam separation chamber.

* * * * *